US012623417B2

(12) United States Patent　　　　　(10) Patent No.: US 12,623,417 B2
Chen et al.　　　　　　　　　　　　(45) Date of Patent: May 12, 2026

(54) FIXATION FIXTURE, PROCESSING DEVICE AND METHOD FOR MAKING LIQUID CRYSTAL LENS

(71) Applicants:Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventors: Chien-Cheng Chen, Zhunan (TW); Po-Lun Chen, Zhunan (TW); Yun-Pei Chen, New Taipei (TW)

(73) Assignees: Interface Technology (ChengDu) Co., Ltd, Chengdu (CN); INTERFACE OPTOELECTRONICS (SHENZHEN) CO., LTD, Shenzhen (CN); GENERAL INTERFACE SOLUTION LIMITED, Zhunan (TW)

( * ) Notice: Subject to any disclaimer, the term of this patent is extended or adjusted under 35 U.S.C. 154(b) by 265 days.

(21) Appl. No.: 18/236,897

(22) Filed: Aug. 22, 2023

(65) Prior Publication Data

US 2025/0028220 A1　　Jan. 23, 2025

(30) Foreign Application Priority Data

Jul. 21, 2023　(CN) .......................... 202310924115.9

(51) Int. Cl.
*B29D 11/00*　　(2006.01)
*G02F 1/29*　　(2006.01)

(52) U.S. Cl.
CPC .... *B29D 11/00009* (2013.01); *B29D 11/0048* (2013.01); *G02F 1/294* (2021.01); *G02F 2201/46* (2013.01)

(58) Field of Classification Search
CPC .......... B29D 11/00009; B29D 11/0048; G02F 1/294; G02F 2201/46
See application file for complete search history.

(56) References Cited

U.S. PATENT DOCUMENTS

2004/0173928 A1* 9/2004 Suh ........................ C04B 28/105
428/688

FOREIGN PATENT DOCUMENTS

CN　　219054112　　5/2023
TW　　201341888　　10/2013

* cited by examiner

*Primary Examiner* — Mathieu D Vargot
(74) *Attorney, Agent, or Firm* — ScienBiziP, P.C.

(57) ABSTRACT

A fixation fixture includes a lower fixture, a middle fixture, and an upper fixture. The lower fixture includes a loading stage for carrying an object. The middle fixture is removably installed on the lower fixture and defines a through hole to expose the loading stage. A retaining edge extends from wall of the through hole. The upper fixture is removably installed on the middle fixture and extends in the through hole. A processing device and a method for making a liquid crystal lens are also provided.

17 Claims, 9 Drawing Sheets

<u>100</u>

30

20

10

200

Heating

Ultraviolet Light

FIXATION FIXTURE, PROCESSING DEVICE AND METHOD FOR MAKING LIQUID CRYSTAL LENS

FIELD

The subject matter herein generally relates to a field of liquid crystal lens, particularly relates to a fixation fixture used in a method for making a liquid crystal lens, a processing device having the fixation fixture, and the method for making the liquid crystal lens.

BACKGROUND

With the development of virtual reality (VR) devices, consumers have higher requirements for lightness, imaging quality, and wearing experience of VR. Pancake technology utilizes optical path folding and has characteristics such as relatively small field of view, lightweight, and portability. Pancake technology combined with passive liquid crystal lenses can solve the Vergence accommodation conflict (VAC) of vision. However, during the manufacturing processes of liquid crystal lenses have the several challenges, such as a conventional heating equipment may not effectively fix the liquid crystal and solid-state lens, resulting in the inability of the liquid crystal to be neatly arranged in specific positions and uneven thickness of the liquid crystal. A conventional heating equipment may not fix concave and convex lenses.

Therefore, there is room for improvement in the art.

BRIEF DESCRIPTION OF THE DRAWINGS

Implementations of the present technology will now be described, by way of embodiments only, with reference to the attached figures.

DETAILED DESCRIPTION

Figure 1:
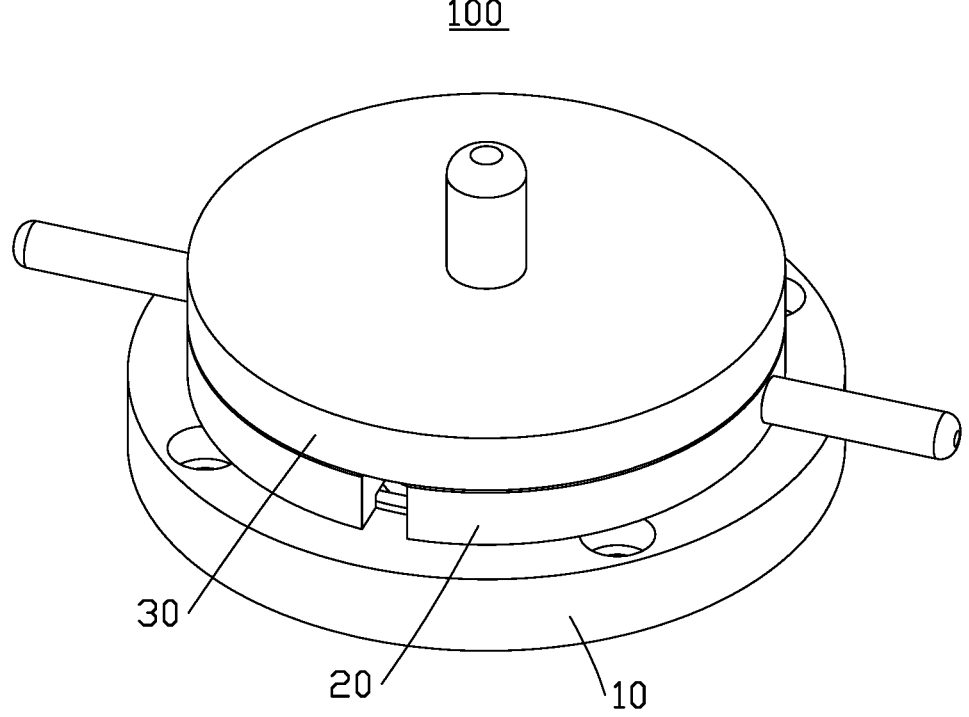
FIG. 1 is an isometric view of a fixation fixture according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

A liquid crystal lens used in the VR field, includes a transparent first curved substrate, a transparent second curved substrate, and a solid-state liquid crystal layer between the first curved substrate and the second curved substrate.

The present disclosure provides a method for making the liquid crystal lens. The method uses a transparent first curved substrate, a transparent second curved substrate, and liquid crystal as raw materials. During the making process, a fixation fixture is used, which enables the raw materials to be well fixed during the making process of the liquid crystal lens, thereby obtaining a liquid crystal lens with good performance and stable quality.

Figure 2:
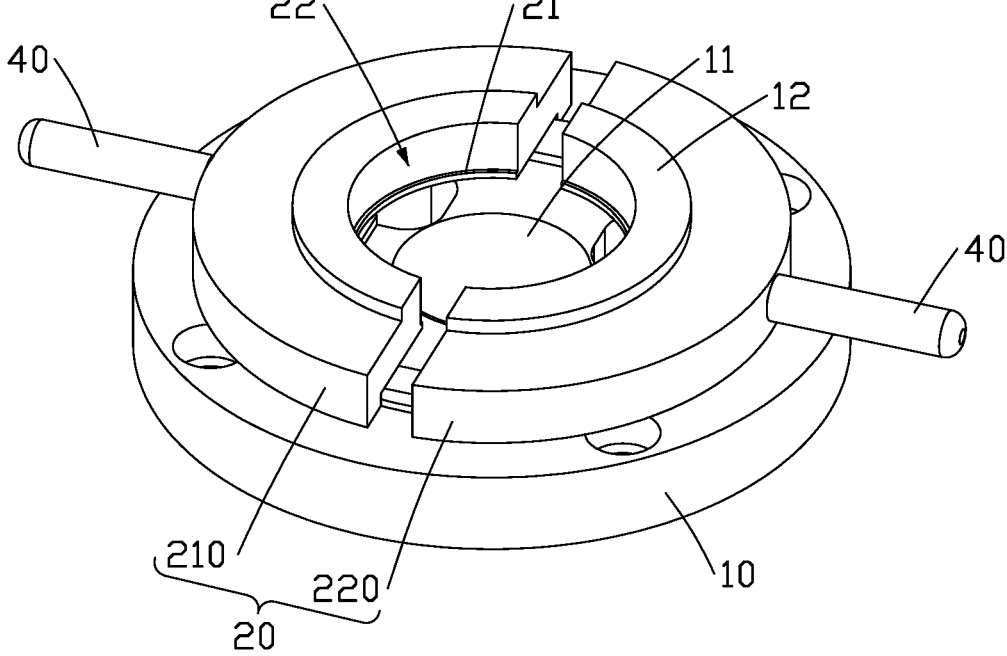
FIG. 2 is an isometric view of a part of the fixation fixture of FIG. 1.

As shown in FIG. 1 and FIG. 2, a fixation fixture 100 of a first embodiment includes a lower fixture 10, a middle fixture 20, and an upper fixture 30. The middle fixture 20 is between the lower fixture 10 and the upper fixture 30. The lower fixture 10 carries the middle fixture 20 and the upper fixture 30.

Figure 8:
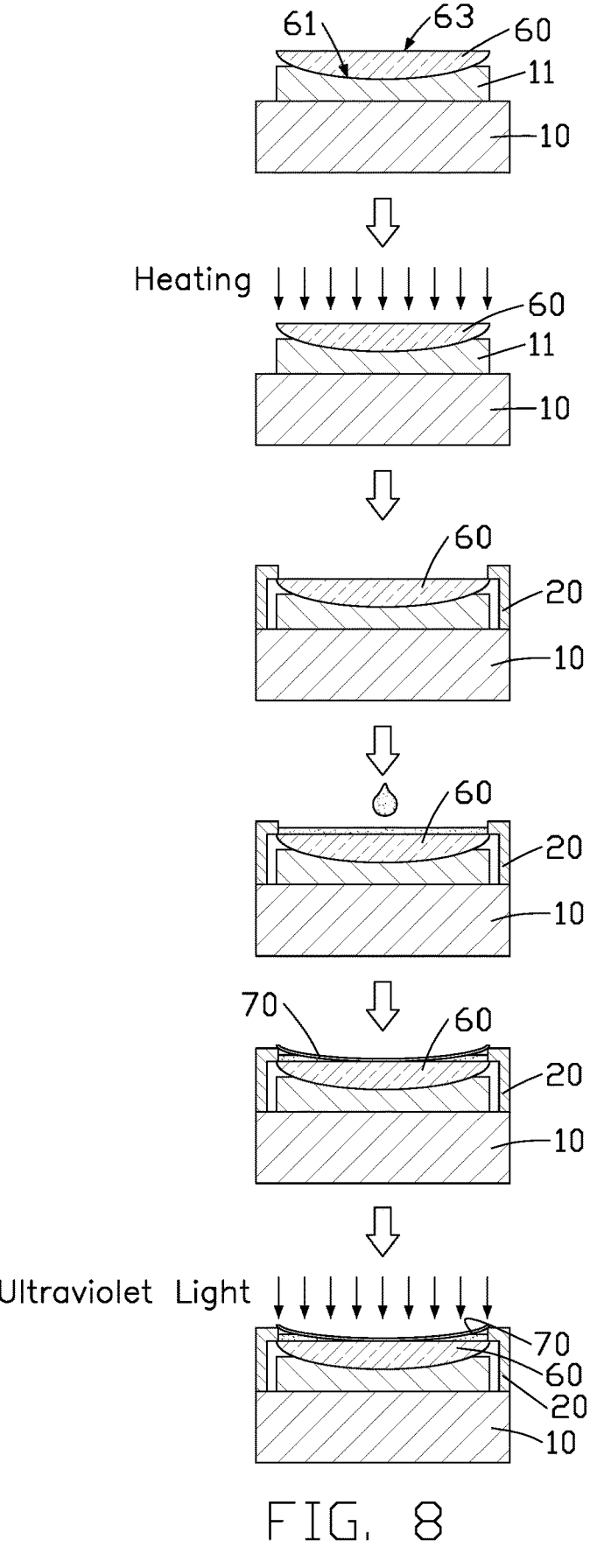
FIG. 8 is a flow chart showing a making process of a liquid crystal lens.

As shown in FIG. 8, in the present embodiment, the first curved substrate 60 has two opposite surfaces that are a convex curved surface 61 and a plane 63. That is, the first curved substrate 60 is a flat convex substrate. The second curved substrate 70 has two opposite surfaces that are convex in a same direction. That is, the second curved substrate 70 is a convex substrate. The shapes of the first substrate and the second substrate can also be designed according to required products.

Figure 3:
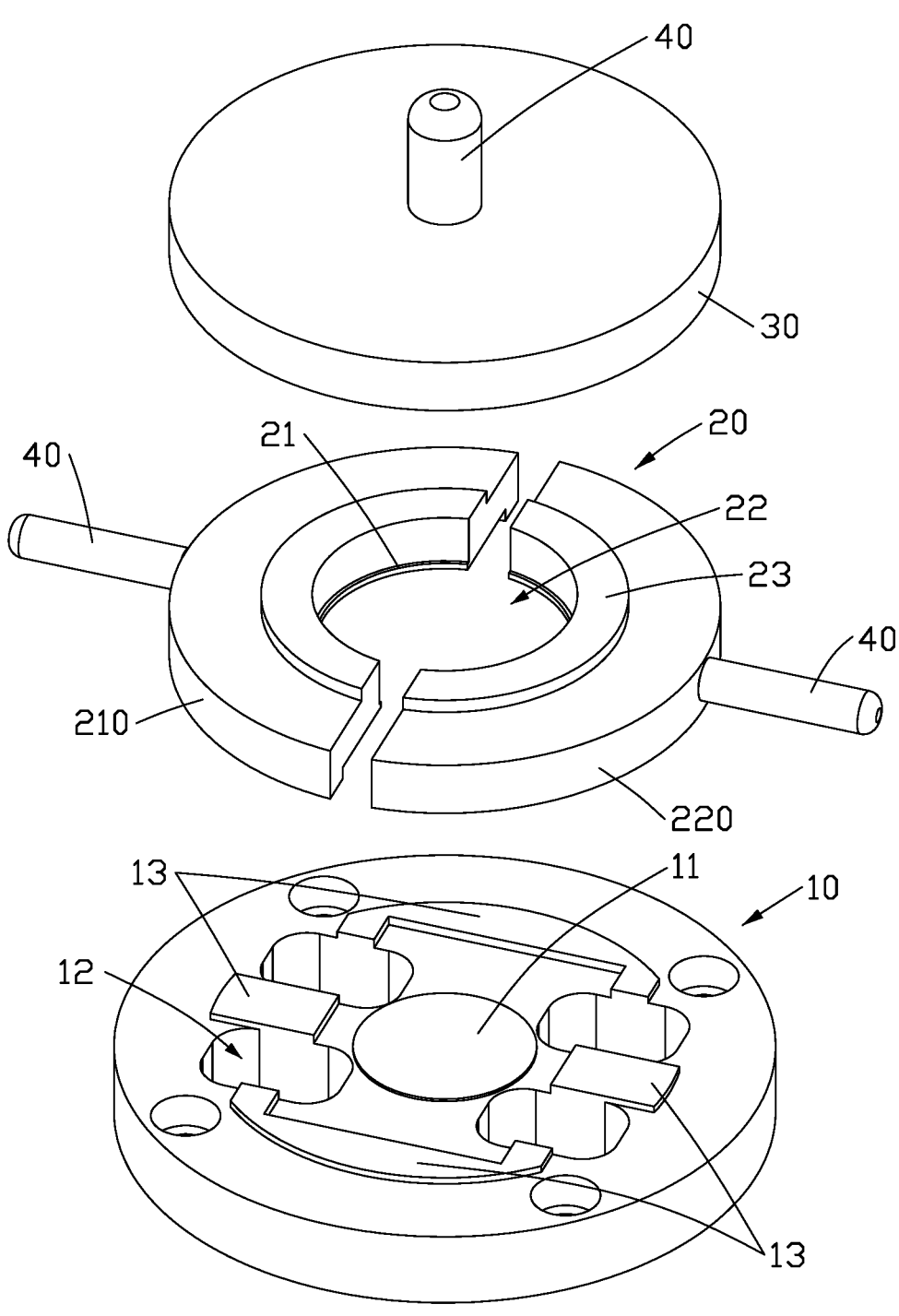
FIG. 3 is an exploded view of the fixation fixture of FIG. 1.
Figure 6:
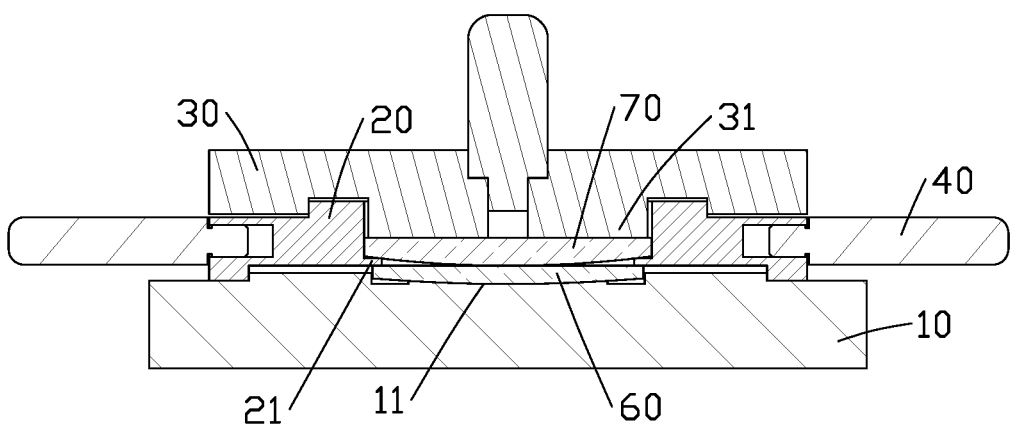
FIG. 6 is a cross-sectional view of the fixation fixture of FIG. 1.

The lower fixture 10 is used to carry an object (the first curved substrate 60). As shown in FIG. 2 and FIG. 3, the lower fixture 10 includes a loading stage 11 for carrying the first curved substrate 60. In this embodiment, the lower fixture 10 has a circular disc shape, and the loading stage 11 is circular and in a center of the lower fixture 10. As shown in FIG. 6 and FIG. 8, when the first curved substrate 60 is placed on the loading stage 11, the curved surface 61 is facing downwards and the plane 63 is facing upwards. Therefore, a surface of the loading stage 11 used to carry the first curved substrate 60 is a curved surface, and its curvature matches a curvature of the curved surface 61 of the first curved substrate 60, so that the curved surface 61 can fit well on the loading stage 11. In this way, the first curved substrate 60 can be stably placed on the loading stage 11. In this embodiment, an area size of the first curved substrate 60 is greater than that of the loading stage 11, and the first curved substrate 60 is partially attached to the loading stage 11.

The middle fixture 20 matches with the lower fixture 10 and can be removably installed on the lower fixture 10. The middle fixture 20 is configured to fix the first curved substrate 60 on the lower fixture 10 and carry the second curved substrate 70. As shown in FIG. 2, a through hole 22 is defined in the middle fixture 20 and the through hole 22 extends the middle fixture 20 along its thickness direction. When the middle fixture 20 is installed on the lower fixture 10, the loading stage 11 is relatively exposed by the through hole 22. In this embodiment, an opening area of the through hole 22 is greater than an area of the loading stage 11. As shown in FIG. 2, the middle fixture 20 includes a retaining edge 21 extending from wall of the through hole 22.

As shown in FIG. 6, a side of the retaining edge 21 facing the lower fixture 10 is used to resist against the first curved substrate 60. The retaining edge 21 can resist against a peripheral part of the plane 63 of the first curved substrate 60. That is, the retaining edge 21 can press the first curved substrate 60 from above. In this way, the first curved substrate 60 is fixed in the fixation fixture 100.

As shown in FIG. 6, a side of the retaining edge 21 away from the lower fixture 10 is used to support the second curved substrate 70, and the retaining edge 21 supports a peripheral part of the second curved substrate 70 facing the lower fixture 10. That is, the retaining edge 21 supports the second curved substrate 70 from below. In this way, the second curved substrate 70 is limited in the middle fixture 20 and cannot move horizontally. The opening shape and size of the through hole 22 are matched with the shape and area size of the second curved substrate 70, so that the second curved substrate 70 can be placed in the through hole 22 and supported by the retaining edge 21.

The retaining edge 21 has a certain height along a thickness direction of the middle fixture 20, which separates the first curved substrate 60 and the second curved substrate 70 from each other. The height of the retaining edge 21 determines a distance between the first curved substrate 60 and the second curved substrate 70. A width of the retaining edge 21 extending towards a center of the through hole 22 determines a width of the retaining edge 21 pressing onto the first curved substrate 60 and a width of the retaining edge 21 supporting the second curved substrate 70.

The upper fixture 30 matches with the middle fixture 20 and can be removably installed on the middle fixture 20. The upper fixture 30 covers the middle fixture 20 and extends into the through hole 22 to press/resist against the second curved substrate 70. In the present embodiment, a pressing part 31 is formed on the surface of the upper fixture 30 facing the middle fixture 20. When the upper fixture 30 is placed on the middle fixture 20, the pressing part 31 can extend into the through hole 22 to resist against an upper surface of the second curved substrate 70. In this way, the second curved substrate 70 is fixed in the fixation fixture 100.

Figure 4:
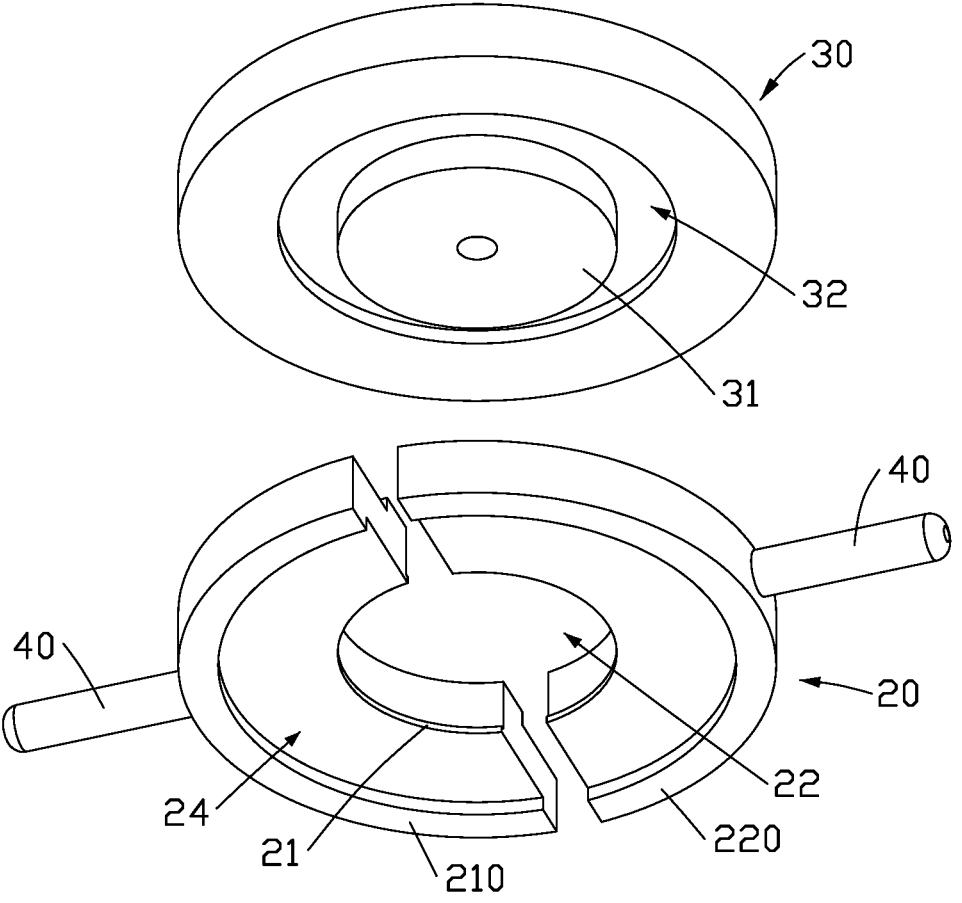
FIG. 4 is an exploded view of the fixation fixture of FIG. 1 along another angle.

As shown in FIG. 3 and FIG. 4, the lower fixture 10 includes a positioning block 13. The positioning block 13 extends from a surface of the lower fixture 10 having the loading stage 11 and is around the loading stage 11. As shown in FIG. 4, a limited groove 24 is defined on a surface of the middle fixture 20 facing the lower fixture 10. The positioning block 13 is matched with the limited groove 24 to limit a horizontal position of the middle fixture 20 on the lower fixture 10. A central of the limited groove 24 connects to the through hole 22. In the present embodiment, the limited groove 24 is a circular groove depress from the surface of the middle fixture 20 facing the lower fixture 10. An external contour of the positioning block 13 matches a shape of the limited groove 24, and a dimension of the positioning block 13 matches a dimension of the limited groove 24. The positioning block 13 of the lower fixture 10 is clamped by the limited groove 24 of the middle fixture 20, indicating that the middle fixture 20 is accurately positioned on the lower fixture 10 and the retaining edge 21 press onto the first curved substrate 60 on the loading stage 11. In the present embodiment, the positioning block 13 is not a continuous layer, but includes at least two parts spaced from each other, and the external contour and dimensions of the at least two parts match the shape and dimensions of the limited groove 24. In other embodiments, the positioning block 13 can also be set as a continuous layer, for example, a circular ring, and the corresponding limited groove 24 can be set as a circular groove.

As shown in FIG. 3 and FIG. 4, the middle fixture 20 includes a positioning protrusion 23, the positioning protrusion 23 protrudes from a surface of the middle fixture 20 facing away from the lower fixture 10. The upper fixture 30 defines a clamping groove 32 on a surface of the upper fixture 30 facing the middle fixture 20. The clamping groove 32 is matched with the positioning protrusion 23 to confine the positioning protrusion 23 to within the clamping groove 32, so that the upper fixture 30 is accurately positioned on the middle fixture 20. In this embodiment, the positioning protrusion 23 has a shape of a circular ring, and the clamping groove 32 has a shape of a circular ring. The shape and size of the positioning protrusion 23 match the shape and size of the clamping groove 32, and the positioning protrusion 23 can be clamped in the clamping groove 32. In the upper fixture 30, the clamping groove 32 surrounds the pressing part 31.

In the present disclosure, in order to more conveniently place the middle fixture 20 on the lower fixture 10 and the middle fixture 20 better press the first curved substrate 60, the middle fixture 20 includes a first part 210 and a second part 220 spaced apart from each other. The first part 210 and the second part 220 cooperate with each other to define the through hole 22. In this embodiment, the first part 210 and the second part 220 are set as symmetrical structures, but not limited to this. The retaining edge 21 is formed on both the first part 210 and the second part 220. The positioning protrusion 23 is also formed on both the first part 210 and the second part 220. That is, a portion of the retaining edge 21 is formed on the first part 210, and other portion of the retaining edge 21 is formed on the second part 220. A portion of the positioning protrusion 23 is formed on the first part 210, and other portion of the positioning protrusion 23 is formed on the second part 220. The limited groove 24 is also formed in both the first part 210 and the second part 220. When place the middle fixture 20 on the lower fixture 10, the first part 210 and the second part 220 can be pushed horizontally on the upper fixture 30 towards a direction of the loading stage 11 (a central direction), until the positioning block 13 of the lower fixture 10 both resist against wall of the limited groove 24 of both the first part 210 and the second part 220, and the middle fixture 20 cannot move anymore, which indicates that the middle fixture 20 is accurately placed on the lower fixture 10. At this time, the retaining edge 21 is also well pressed onto the first curved substrate 60. When the product (liquid crystal lens) is prepared, the separated first part 210 and second part 220 can also be quickly removed from the lower fixture 10 in a horizontally opposite direction (left and right) to avoid scratching the liquid crystal lens caused by the middle fixture 20 during the removal process.

In order to facilitate picking up the middle fixture 20 or the upper fixture 30, at least one of the middle fixture 20 and the upper fixture 30 includes a handle 40. As shown in FIG. 3, in this embodiment, both the middle fixture 20 and the upper fixture 30 include handles 40. In this embodiment, both the first part 210 and the second part 220 includes a handle 40. The upper fixture 30 includes a handle 40 on a surface of the upper fixture 30 away from the lower fixture 10.

As shown in FIG. 2, the lower fixture 10 defines at least one pick-up slot 12 on the surface of the lower fixture 10 having the loading stage 11. In this embodiment, there are four pick-up slots 12. The pick-up slots 12 are located adjacent to the loading stage 11. After the liquid crystal lens is prepared, the liquid crystal lens can be easily and quickly removed by the pick-up slot 12 from the lower fixture 10 to reduce scratches on the liquid crystal lens.

Figure 5:
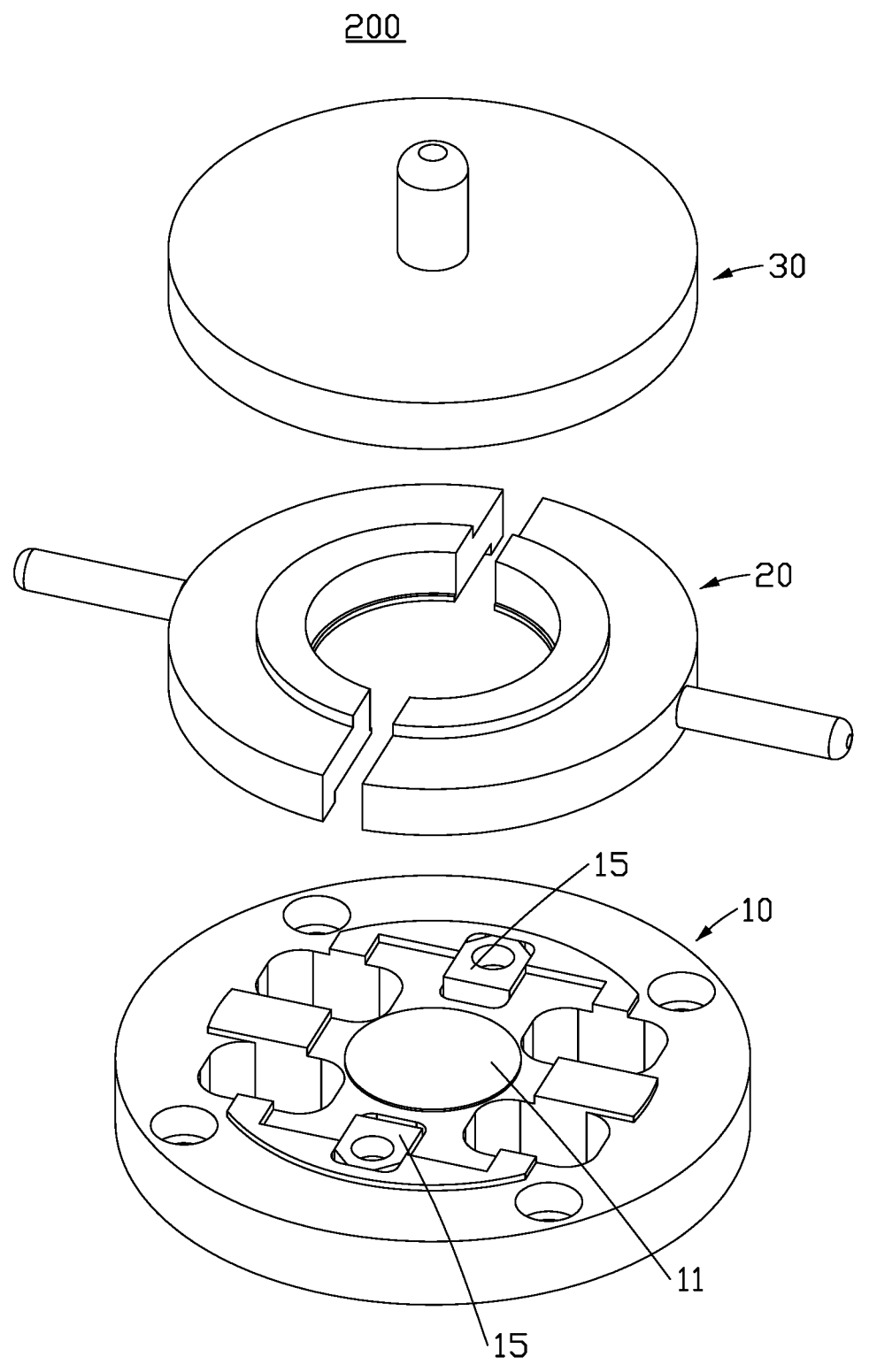
FIG. 5 is an exploded view of a fixation fixture according to a second embodiment of the present disclosure.

As shown in FIG. 5, a fixation fixture 200 of a second embodiment is basically the same as the fixation fixture 100 of the first embodiment, and also includes a lower fixture 10, a middle fixture 20, and an upper fixture 30. The difference between the fixation fixture 200 and the fixation fixture 100 is that the lower fixture 10 of the fixation fixture 200 further includes two fixing blocks 15 protruding from the surface of the lower fixture 10 having the loading stage 11, and the two fixing blocks 15 are relatively arranged on opposite sides of the loading stage 11. The two fixing blocks 15 are used to limit the first curved substrate 60 on the loading stage 11. In this way, when placing the first curved substrate 60 on the loading stage 11, the first curved substrate 60 can be quickly and accurately placed on the loading stage 11, saving time and increasing stability of the first curved substrate 60 on the lower fixture 10. In this embodiment, a protrusion height of the fixing block 15 on the lower fixture 10 is less than or equal to a depth of the limited groove 24, so as not to affect the placement of the middle fixture 20 on the lower fixture 10. In other embodiments, although not shown in the figure, when the protrusion height of the of the fixing block 15 on the lower fixture 10 is greater than the depth of the limited groove 24, an accommodating groove can also be defined on the surface of the middle fixture 20 facing the lower fixture 10 to accommodate the fixing block 15.

Due to the high temperature heating required during the using process of the fixation fixture 100/200, the fixation fixture 100/200 needs to have a certain degree of thermal conductivity and heat resistance, the fixation fixture 100/200 can be made of metal materials, but not limited to this.

Figure 7:
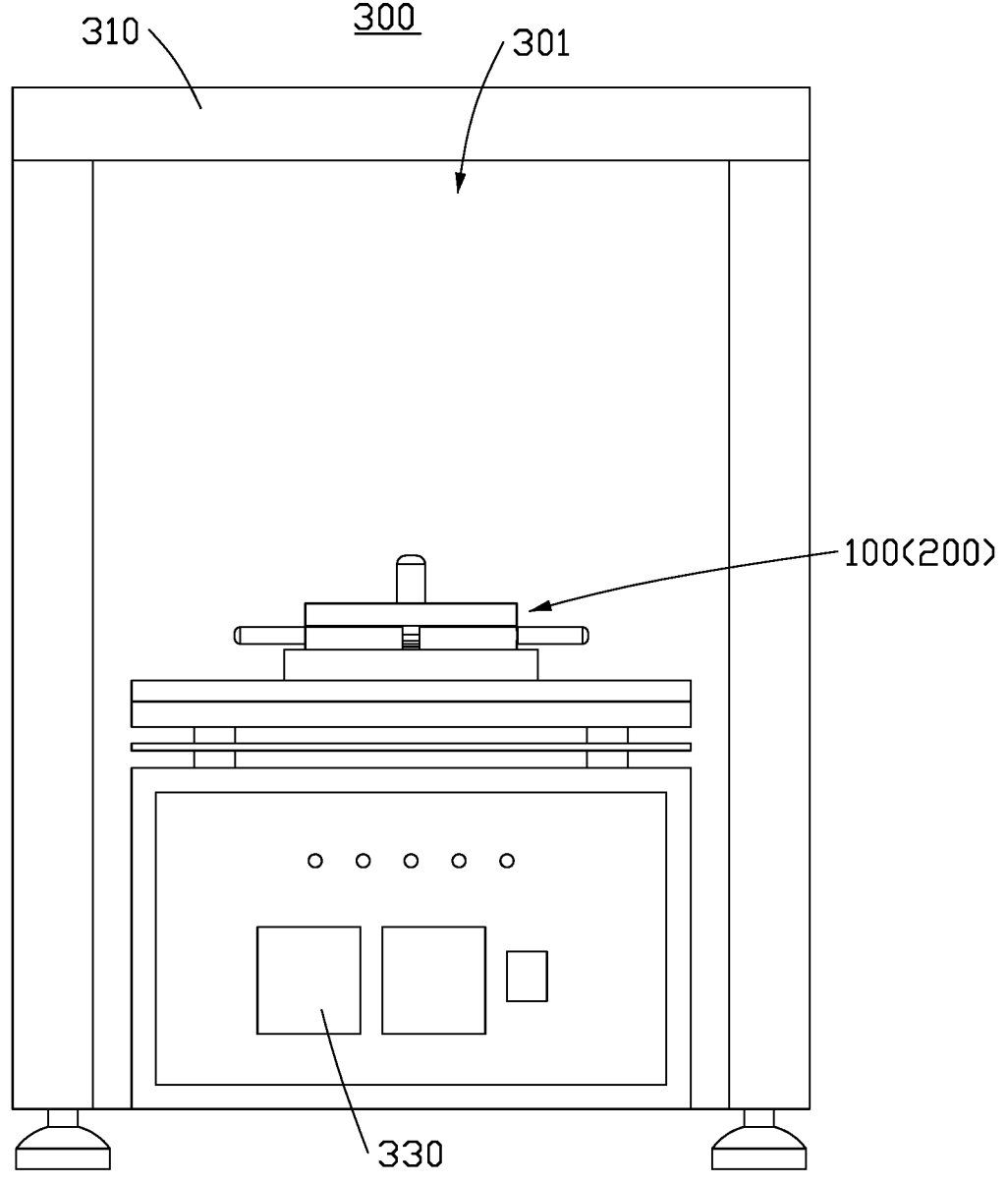
FIG. 7 is a plan view of a processing device.

As shown in FIG. 7, a processing device 300 for making the liquid crystal lens is also provided. The processing device 300 includes a frame 310 having an accommodating space 301, the fixation fixture 100/200, and a heater 330. The fixation fixture 100/200 is in the accommodating space 301. The heater 330 is located at a lower part of the frame 310 and under the fixation fixture 100/200. Although not shown in the figure, the frame 310 can be equipped with a transparent door, such as a transparent door made of acrylic material, to facilitate observation of an interior of the accommodating space. The frame 310 can be made of aluminum alloy material, but not limited to this. The processing device 300 is also equipped with a power supply, a temperature controller, and a timer as needed.

Vacuum suction is commonly used to pick up and fix products. However, for high temperature conditions that require heating, vacuum suction can easily lead to abnormal vacuum machines, making the preparation process to be difficult to be controlled stability. For preparation methods that require long-time fixing of products, such as a 4-hour fixing process, the use of vacuum fixed products invisibly increases costs. Therefore, by using the fixation fixture of the present disclosure, stable and fast positioning of the raw materials of the product can be achieved, thereby obtaining a product with stable quality and effectively saving preparation costs.

Figure 9:
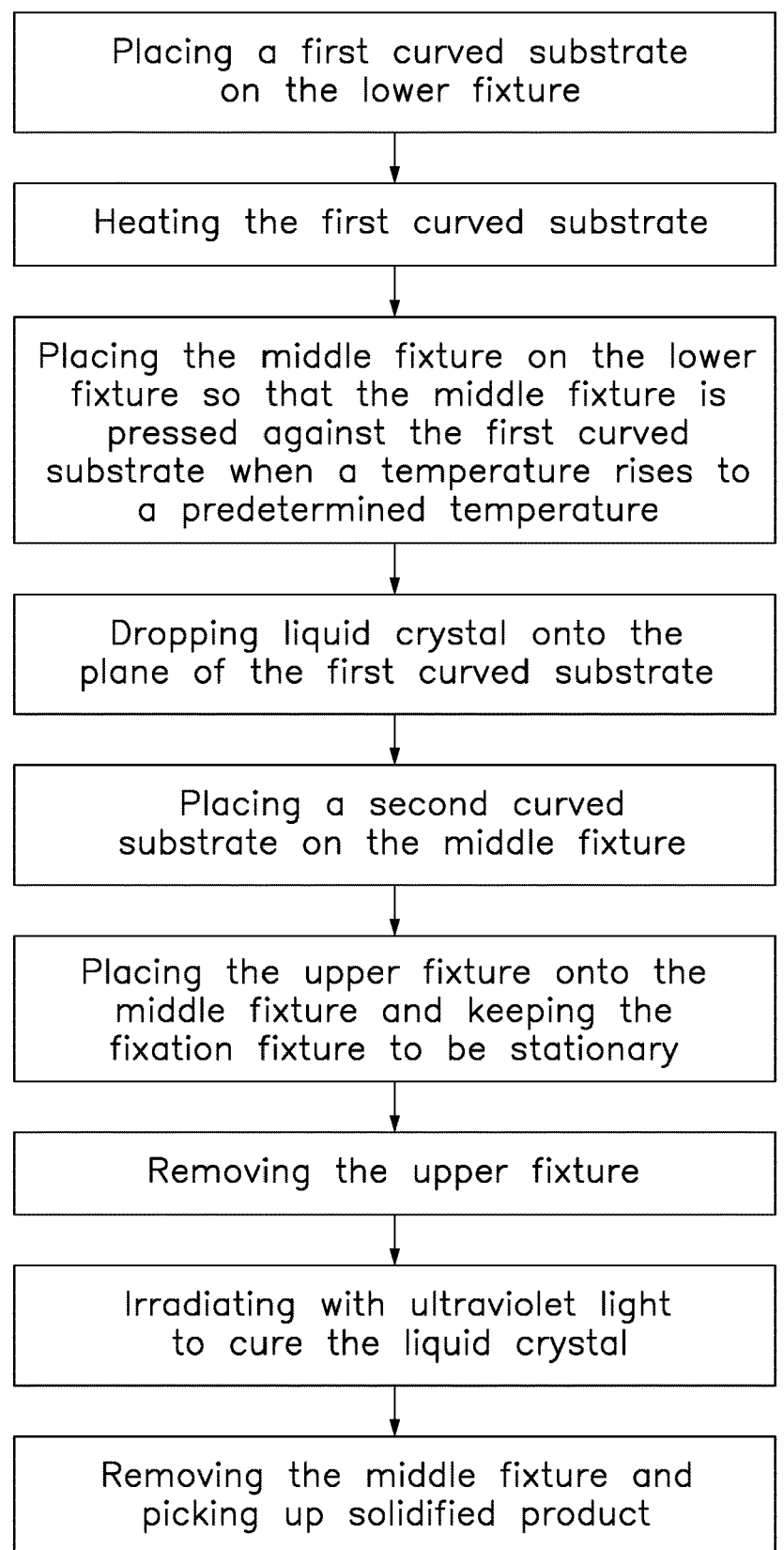
FIG. 9 is a flow chart of a method for making a liquid crystal lens.

As shown in FIG. 8 and FIG. 9, a method for making the liquid crystal lens using the processing device 300 is also provided and includes following steps S1 to S8.

S1: Placing a first curved substrate 60 on the loading stage 11 of the lower fixture 10. The first curved substrate 60 has a convex curved surface 61 and a plane 63 opposite to the curved surface 61, and the curved surface 61 is attached on the loading stage 11. The lower fixture 10 is pre-placed in the accommodating space 301 of the processing device 300. The processing device 300 is opened and the first curved substrate 60 is placed on the loading stage 11.

S2: Heating the first curved substrate. This step specifically involves turning on the power of the processing device 300 and turning on the heater 330 to heat the lower fixture 10 and the first curved substrate 60. The heating temperature (such as setting the temperature to be 110 degrees Celsius) and time can be set.

S3: When a temperature rises to a predetermined temperature, placing the middle fixture 20 on the lower fixture 10 so that the middle fixture 20 is pressed against the first curved substrate and keeping the predetermined temperature. This step specifically involves pushing the first part 210 and the second part 220 horizontally towards the loading stage 11 on the upper fixture 30, until the positioning block 13 on the lower fixture 10 resist against wall of the limited groove 24 in the first part 210 and the second part 220.

S4: Dropping specially made liquid crystal onto the plane 63 of the first curved substrate 60 exposing to the middle fixture 20.

S5: Placing a second curved substrate 70 on the retaining edge 21 of the middle fixture 20, wherein the liquid crystal connected between the first curved substrate 60 and the second curved substrate 70.

S6: Placing the upper fixture 30 onto the middle fixture 20 and keeping the fixation fixture to be stationary, and the first curved substrate 60 and the second curved substrate 70 remain relatively fixed, and the keep stationary time can be, for example, four hours.

S7: Removing the lower fixture 10 and irradiating with ultraviolet light to cure the liquid crystal.

S8: Removing the middle fixture 20 and pick up the solidified product.

By using the fixation fixture, a stable and fast positioning of raw materials during product preparation process can be achieved, thereby obtaining products with stable quality and effectively saving preparation costs.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A fixation fixture comprising:
a lower fixture, the lower fixture comprising a loading stage configured for carrying a first object;
a middle fixture, the middle fixture removably installed on the lower fixture, the middle fixture comprising a through hole to expose the loading stage, and a retaining edge extending inwardly from a wall of the through hole, wherein the retaining edge has a height along a thickness direction of the middle fixture, a first side of the retaining edge facing the lower fixture is configured for resisting against the first object placed on the loading stage, and a second side away from the lower fixture is configured for supporting a second object, thereby maintaining a predetermined distance between the first object and the second object by the height of the retaining edge; and an upper fixture, the upper fixture removably installed on the middle fixture and extending in the through hole.

2. The fixation fixture of claim 1, further comprising two fixing blocks protruding from a surface of the lower fixture having the loading stage, wherein the two fixing blocks are arranged on opposite sides of the loading stage.

3. The fixation fixture of claim 1, wherein the middle fixture comprises a first part and a second part spaced apart from each other, the first part and the second part cooperate with each other to define the through hole, the retaining edge is formed on both the first part and the second part.

4. The fixation fixture of claim 1, wherein a positioning block protrudes from a surface of the lower fixture having the loading stage and surrounds the loading stage, a limited groove is formed on a surface of the middle fixture facing the lower fixture, and the positioning block is matched with the limited groove to limit a position of the middle fixture on the lower fixture.

5. The fixation fixture of claim 1, wherein a positioning protrusion protrudes from a surface of the middle fixture facing away from the lower fixture, the upper fixture comprises a clamping groove on a surface of the upper fixture facing the middle fixture, and the clamping groove is matched with the positioning protrusion to confine the positioning protrusion to within the clamping groove.

6. The fixation fixture of claim 1, wherein a pressing part is formed on a surface of the upper fixture facing the middle fixture, the pressing part is configured to extend into the through hole.

7. The fixation fixture of claim 1, wherein each of the middle fixture and the upper fixture comprises a handle.

8. The fixation fixture of claim 1, wherein the lower fixture comprises at least one pick-up slot on a surface of the lower fixture having the loading stage, the pick-up slot is located next to the loading stage.

9. A processing device comprising:

a frame comprising an accommodating space;

a fixation fixture in the accommodating space, the fixation fixture comprising:

a lower fixture, the lower fixture comprising a loading stage configured for carrying a first object;

a middle fixture, the middle fixture removably installed on the lower fixture, the middle fixture defining a through hole to expose the loading stage, and a retaining edge extending inwardly from a wall of the through hole, wherein the retaining edge has a height along a thickness direction of the middle fixture, a first side of the retaining edge facing the lower fixture is configured for resisting against the first object placed on the loading stage, and a second side away from the lower fixture is configured for supporting a second object, thereby maintaining a predetermined distance between the first object and the second object by the height of the retaining edge; and an upper fixture, the upper fixture removably installed on the middle fixture and extending in the through hole; and a heater under the fixation fixture.

10. The processing device of claim 9, further comprising two fixing blocks protruding from a surface of the lower fixture having the loading stage, wherein the two fixing blocks are arranged on opposite sides of the loading stage.

11. The processing device of claim 9, wherein the middle fixture comprises a first part and a second part spaced apart from each other, the first part and the second part cooperate with each other to define the through hole, the retaining edge is formed on both the first part and the second part.

12. The processing device of claim 9, wherein a positioning block protrudes from a surface of the lower fixture having the loading stage and is around the loading stage, a limited groove is formed on a surface of the middle fixture facing the lower fixture, and the positioning block is matched with the limited groove to limit a position of the middle fixture on the lower fixture.

13. The processing device of claim 9, wherein a positioning protrusion protrudes from a surface of the middle fixture facing away from the lower fixture, the upper fixture comprises a clamping groove on a surface of the upper fixture facing the middle fixture, and the clamping groove is matched with the positioning protrusion to confine the positioning protrusion to within the clamping groove.

14. The processing device of claim 9, wherein a pressing part is formed on a surface of the upper fixture facing the middle fixture, the pressing part is configured to extend into the through hole.

15. The processing device of claim 9, wherein each of the middle fixture and the upper fixture comprises a handle.

16. The processing device of claim 9, wherein the lower fixture comprises at least one pick-up slot on a surface of the lower fixture having the loading stage, the pick-up slot is located adjacent to the loading stage.

17. A fixation fixture comprising:

a lower fixture, the lower fixture comprising a loading stage configured for carrying an object;

a middle fixture, the middle fixture removably installed on the lower fixture, the middle fixture comprising a through hole to expose the loading stage, and a retaining edge extending inwardly from a wall of the through hole; and an upper fixture, the upper fixture removably installed on the middle fixture and extending in the through hole;

wherein a positioning block protrudes from a surface of the lower fixture having the loading stage and surrounds the loading stage, a limited groove is formed on a surface of the middle fixture facing the lower fixture, and the positioning block is matched with the limited groove to limit a position of the middle fixture on the lower fixture; and a positioning protrusion protrudes from a surface of the middle fixture facing away from the lower fixture, the upper fixture comprises a clamping groove on a surface of the upper fixture facing the middle fixture, and the clamping groove is matched with the positioning protrusion to confine the positioning protrusion to within the clamping groove.

* * * * *